United States Patent
Moscatiello

(10) Patent No.: US 12,408,795 B2
(45) Date of Patent: Sep. 9, 2025

(54) PIZZA FRYER

(71) Applicant: Agnese Moscatiello, Caserta (IT)

(72) Inventor: Agnese Moscatiello, Caserta (IT)

( * ) Notice: Subject to any disclaimer, the term of this patent is extended or adjusted under 35 U.S.C. 154(b) by 993 days.

(21) Appl. No.: 17/314,073

(22) Filed: May 7, 2021

(65) Prior Publication Data
US 2021/0345826 A1 Nov. 11, 2021

(30) Foreign Application Priority Data

May 7, 2020 (IT) .................. 102020000010240

(51) Int. Cl.
*A47J 37/12* (2006.01)
(52) U.S. Cl.
CPC ....... *A47J 37/1214* (2013.01); *A47J 37/1233* (2013.01); *A47J 37/1223* (2013.01)
(58) Field of Classification Search
CPC .............. A47J 37/1214; A47J 37/1223; A47J 37/1233; A47J 37/12
See application file for complete search history.

(56) References Cited

U.S. PATENT DOCUMENTS

| | | | | |
|---|---|---|---|---|
| 2,853,937 A * | 9/1958 | Peck | ............... | A47J 37/1214 99/407 |
| 3,203,341 A * | 8/1965 | Hedgepeth | .......... | A47J 37/1214 99/330 |
| 3,641,923 A * | 2/1972 | Wilkinson | .......... | A47J 37/1214 99/404 |
| 3,680,474 A * | 8/1972 | Brown | ............... | A47J 37/1214 99/427 |
| 3,763,764 A * | 10/1973 | Schy | ................ | A21B 5/08 99/427 |
| 4,170,659 A * | 10/1979 | Totino | ............ | A21B 5/08 426/138 |
| 4,187,771 A * | 2/1980 | Westover | .......... | A21B 5/08 99/427 |
| 4,333,415 A * | 6/1982 | Miller | ............ | A23P 20/12 118/16 |
| RE31,819 E * | 1/1985 | Weiss | ............... | A47J 37/1214 99/405 |
| 4,808,423 A * | 2/1989 | Hansson | .......... | A23L 17/75 426/295 |
| 4,882,984 A * | 11/1989 | Eves, II | ............ | A47J 37/1214 99/406 |
| 5,322,006 A * | 6/1994 | Morioka | .......... | A47J 37/1214 99/405 |
| 5,865,102 A * | 2/1999 | Haraldsson | ......... | A47J 37/1233 210/DIG. 8 |
| 6,875,458 B2 * | 4/2005 | Dove | ............... | A47J 37/1214 426/523 |

(Continued)

*Primary Examiner* — Sean M Michalski
(74) *Attorney, Agent, or Firm* — Bayramoglu Law Offices LLC

(57) ABSTRACT

A fryer for frying pizza includes a flying tank designed to contain cooking oil, immersion means and pushing means. The frying tank includes an input and an outlet. The input houses a first conveyor belt arranged to introduce a product in the tank. The outlet houses the first conveyor belt or a third conveyor belt to extract the product from the tank. The immersion means are arranged to regulate immersion of the product in the cooking oil during at least a portion of a relative path from the input to the outlet of the tank. The pushing means are configured for moving the product from the input to the outlet.

14 Claims, 2 Drawing Sheets

(56) References Cited

U.S. PATENT DOCUMENTS

| | | | | |
|---|---|---|---|---|
| 7,207,263 | B2* | 4/2007 | Henson | A47J 37/1228 |
| | | | | 99/405 |
| 7,798,058 | B2* | 9/2010 | Basker | A47J 37/1214 |
| | | | | 99/405 |
| 10,092,136 | B2* | 10/2018 | Machida | A47J 37/1214 |
| 2005/0045049 | A1* | 3/2005 | Muniga | A23P 20/12 |
| | | | | 99/494 |
| 2008/0063768 | A1* | 3/2008 | Rasanayagam | A47J 37/1266 |
| | | | | 99/330 |
| 2010/0247726 | A1* | 9/2010 | van der Eerden | A47J 37/1214 |
| | | | | 426/438 |
| 2012/0070553 | A1* | 3/2012 | Hockett | A47J 37/1214 |
| | | | | 426/438 |
| 2014/0356496 | A1* | 12/2014 | Melnyczuk | A23B 7/0205 |
| | | | | 426/523 |
| 2015/0086689 | A1* | 3/2015 | Machida | A47J 37/1276 |
| | | | | 426/438 |
| 2018/0092492 | A1* | 4/2018 | Machida | A23L 5/10 |
| 2019/0059423 | A1* | 2/2019 | Kitano | A47J 37/1214 |
| 2019/0335950 | A1* | 11/2019 | Savage | A47J 37/1242 |

* cited by examiner

PIZZA FRYER

CROSS REFERENCE TO THE RELATED APPLICATIONS

This application is based upon and claims priority to Italian Patent Application No. 202000010240, filed on May 7, 2020, the entire contents of which are incorporated herein by reference.

TECHNICAL FIELD

The present invention relates to the field of frying machines in the industrial field.

BACKGROUND

Fried pizza is a well-known product.

Fried pizza lends itself to being seasoned/stuffed with the most disparate ingredients generally in two ways On the surface, after cooking or Inside, before cooking.

In both cases, cooking by flying takes place by immersion in cooking oil and/or fat at temperatures that ranges in an interval that varies between 150 and 200° C.

For convenience, the first type of filling indicates a "fried pizza", while the second type of filling indicates a "fried stuffed pizza". In the following, we prefer to refer more simply to a "product", indicating with it a "fried pizza" or a "fried stuffed pizza".

The production of fried pizza is still completely manual today.

The manual frying process consists in placing in hot oil, at the previously indicated temperature, with the help of a metal rod and a skimmer specially designed for the function.

In this initial phase, care must be taken to place the pizza in the oil slowly horizontally, preventing it from rolling ruinously on itself and damaging its shape and avoiding the generation of splashes of boiling oil that can injure the operator.

With the rod and the skimmer, the operator processing the frying helps himself with one of them keeping the pizza semi-immersed in boiling oil and with the other pouring the frying oil also in the upper part of the pizza so that it cooks completely even on the top, albeit more slowly than the bottom side.

Subsequently, towards the end of cooking, with these tools it is also possible to turn the pizza in the oil to obtain uniform cooking.

However, one of the drawbacks of manual frying, in addition to the possibility of the operator being able to easily burn himself with splashes of hot oil while governing the cooking of the pizza, is represented precisely by the excessive irregularity of the surface of the fried pizza due to the very irregular bubbles that form and that often subsequently invalidate the correct stuffing.

Or due to their irregularities, stuffed pizzas tend to break during frying, causing the cooking oil to become dirty due to the filling and, at the same time, the undesired local absorption of oil or frying fat.

Therefore, in the manual control of frying it is possible to have a greater final number of defective pizzas, due to a not always efficient control of the operator and the decrease in his level of attention over time, in fact if they are not efficiently kept under control in cooking dynamics, irregular bubbles develop on the pizzas due to the heat of the cooking oil which increases the pressure of the steam inside the pockets of the dough.

Therefore, the pizzas obtained are very irregular and do not lend themselves to a large-scale diffusion.

If not specifically excluded in the detailed description that follows, what is described in this chapter is to be considered as an integral part of the detailed description.

SUMMARY

The object of the present invention is to present a fryer specifically designed for frying pizzas in an automated way which allows to maintain a high degree of uniformity and therefore low defects in the final product.

The term "product" means a semi-finished product defining a flat laminate, typically a disc, or a wrapper formed by a pizza dough.

The basic idea of the present invention is the realization of a flying tank designed to contain cooking oil, and comprising an inlet, housing a first conveyor belt arranged to introduce a product into the tank, an outlet, housing a portion of the first conveyor belt or a second conveyor belt for extracting the product from the tank and means of immersion of the product arranged to regulate an immersion of the product in the cooking oil during at least a portion of a relative path from the input to the outlet of the tank and means for advancing the product from the input to the outlet of the tub.

Advantageously, the immersion means avoid the formation of large pockets, that is to say bubbles, inside the dough, with a more uniform and substantially defect-free surface of the product.

Furthermore, since it is possible to mechanize the production, the operators assigned to frying can remain distant from the cooking oil, which is notoriously dangerous.

Obviously, the immersion means offer an approximately flat contact surface with respect to the product, having an amplitude transversal to the movement path at least equal to the upper surface of the product itself or multiples thereof.

Preferably, the first conveyor belt is arranged to support the product during a first phase of cooking so as to allow the production of gas in the lower portion of the product, immersed in the boiling oil, which oil forces the expansion of alveoli of the dough which determine the subsequent buoyancy of the product.

The speed of advancement of the first conveyor belt can be adjusted according to the density of the product being cooked. For example, a fried stuffed pizza may be heavier than an unfilled disc of dough and therefore may need a longer first cooking phase for the product to start floating autonomously.

For convenience, the first cooking phase in which the product is not able to float autonomously is indicated as the "first phase", while the second cooking phase in which the product floats autonomously is indicated with "second phase". Similarly, the terms "cooking" and "flying" in the context of the present invention are interchangeable.

Preferably, the immersion means can consist of a fixed sheet of smooth material or a conveyor belt. Furthermore, this conveyor belt can be made of steel mesh, sufficiently dense to define the aforementioned approximately flat surface. Alternatively, this conveyor belt can be made of plastic or composite material, such as Teflon or resins, able to resist cooking temperatures, without contaminating the product.

When the immersion means consist of a fixed sheet of smooth material, the advancement of the product from the input to the outlet can be determined by a conveyor belt arranged under the product preferably equipped with porters and/or by means of nozzles that inject cooking oil under pressure in order to push the product towards the tank outlet.

When the immersion means consist of a conveyor belt, the friction necessary to push the product towards the exit of the tank is proportional to the natural buoyancy of the product.

It has been found that when the product is in the second phase, no irregular bubbles are formed in its lower part, due to the hydrostatic pressure, which acts uniformly on the entire lower surface of the product. Therefore, when a conveyor belt is placed under the product, i.e. immersed in the tank, this must provide for the advancement of the product by means of porters, i.e. without contacting the lower surface of the product. This is particularly advantageous, because the fryer can be used for products of different thickness without making any particular adaptations thereto.

Preferably, the immersion means form an invitation, which gradually leads the product to submerge and pass under the immersion means themselves.

According to another preferred variant of the invention, the fryer comprises a first conveyor belt arranged only to introduce at least one product into the tank and a third, independent, conveyor belt at the output of the tank to extract the cooked product.

Several adjustments can be made:

a) It is possible to adjust the oil height to obtain a greater immersion of the product both in the first phase and in the second phase in which the product is forced to pass under the immersion means;

b) Regarding the first conveyor belt:

It is possible to adjust the position of the first conveyor belt, at the input to the tank, with respect to the oil height to obtain a greater or lesser immersion of the product during the first cooking phase;

It is possible to adjust a speed of advancement of the first conveyor belt so as to favour the detachment of the product from the same belt;

It is possible to tilt the first conveyor belt, at the input to the tank, in order to adjust the immersion speed of the product in the oil;

It is possible to tilt the first (or third) conveyor belt, at the exit of the tank, in order to obtain adequate dripping of the product;

c) Regarding the immersion means:

it is possible to adjust a reciprocal position between the oil surface and the surface of the immersion means intended to contact the upper portion of the product, with an adjustment both in terms of distance and angle with respect to the oil surface;

it is possible to adjust the feed speed of the product when the immersion means are defined by a conveyor belt;

d) Regarding the advancement of the product from the input to the exit of the tank:

an advancement speed can be adjusted so as to achieve a predetermined cooking time;

e) Regarding the entire tank:

It is possible to tilt the tank by means of relative adjustable feet to regulate the interaction time between the immersion means and the product.

All the above adjustments can be made by means of screw elements or any known device to allow the reciprocal positions of objects to be changed.

The oil heating can be achieved by means of a suitable heater housed directly in the tank or by means of a heater housed outside the tank and a circulation circuit that puts the tank in hydraulic communication with the heater.

The dependent claims describe preferred variants of the invention, forming an integral part of this description.

BRIEF DESCRIPTION OF THE DRAWINGS

Further objects and advantages of the present invention will become clear from the following detailed description of an example of its embodiment (and its variants) and from the attached drawings given purely by way of explanation and not limiting

The same reference numbers and letters in the figures identify the same elements or components or functions.

In the context of this description, the term "second" component does not imply the presence of a "first" component. These terms are in fact used as labels to improve clarity and should not be understood in a limiting way.

The elements and features illustrated in the various preferred embodiments, including the drawings, can be combined with each other without however departing from the scope of this application as described below.

DETAILED DESCRIPTION OF THE EMBODIMENTS

The present invention arises from the need to obtain uniform products, that is, with a low rate of variability and defects, especially as regards the formation of bubbles.

In particular, the present device is designed for frying stuffed pizzas or to be stuffed after frying.

More in detail, the present invention aims to allow the mechanization of the frying process of a product.

Figure 1:
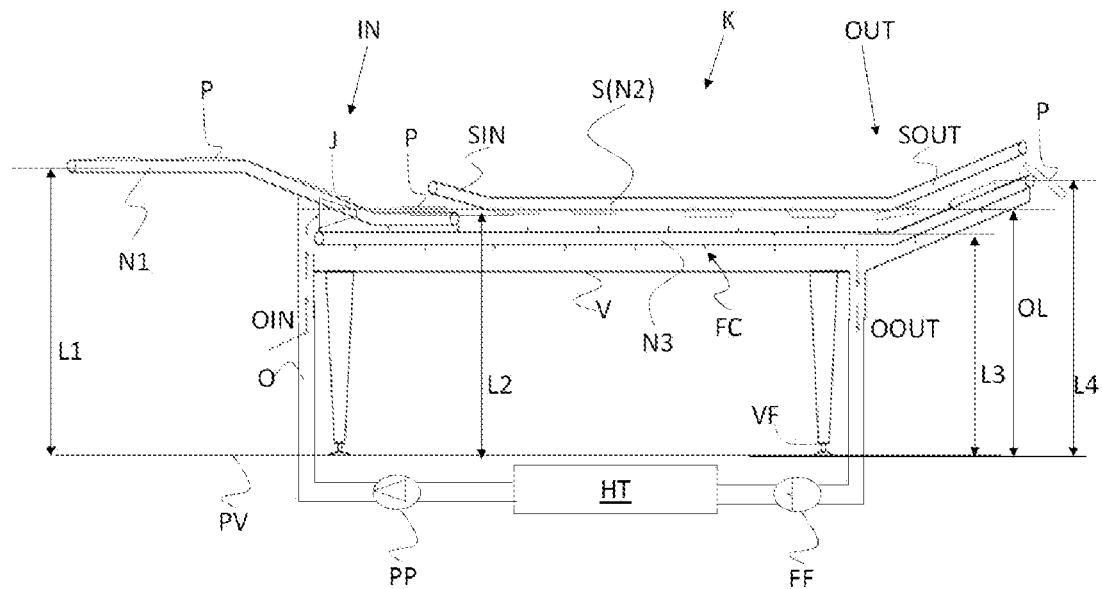
FIG. 1 shows a first preferred variant of the invention.

In FIG. 1, the pizza fryer K comprises a frying tank V, designed to contain cooking oil O, and comprising an input IN which houses a first conveyor belt N1 arranged to introduce a product P into the tank, an outlet OUT housing where a portion of the first conveyor belt or a third conveyor belt N3 is arranged to extract the product P from the tank and immersion means S, N2 of the product, designed to regulate immersion of the product in the cooking oil during at least a portion of a relative path from the input IN to the OUT outlet of tank V.

The tank preferably has an elongated shape, with a length proportional to the cooking time and to the crossing speed of the tank from input to outlet according to the well-known hourly law.

The tank has a width strictly necessary for the transit of a product or a plurality of products.

In any case, the tank is sized in such a way as to prevent the products from contacting each other.

Therefore, the width of the tank and the conveyed belt must be commensurate with the number and width of the products processed simultaneously.

FIG. 1 shows a preferred example in which three conveyor belts are used: N1, N2, N3, nevertheless alternative solutions can also be identified.

According to the present invention, an important aspect is the fact that during a portion of the transit of the product in the tank V, the product is kept immersed in the cooking oil by means of a flat and fixed surface, which limits the formation of irregular bubbles.

As will be seen below, the immersion means do not necessarily comprise a conveyor belt, a fixed surface is instead sufficient, since the movement of the product can be carried out by means of porters attached to the first and/or third belt and/or by means of cooking oil properly introduced in the tank.

In relation to the density of the product, it is optimal to arrange the first conveyor belt in order to introduce the product into the tank delicately and also in such a way as to support the product until it is able to float autonomously.

The first conveyor belt N1 therefore comprises a first portion outside the tank arranged at a first height L1 with respect to the floor PV, generally higher than the height OL of the oil O with respect to the floor PV, and a third portion inside the tank V, arranged in such a way as to be, in operating conditions, at height L2, below the oil height OL, and approximately parallel with the oil height OL. Between the first and second portion, there is an inclined connecting portion which can be rectilinear or parabolic, etc.

The third portion is a few millimeters below the oil height, preferably from 1 to 30 mm. This also depends on the thickness of the product. Therefore, it is advisable to be able to adjust either the position of the first conveyor belt with respect to the tank or the oil height inside the tank or it is necessary to adjust the support feet VF of the tank. For example, by lowering the feet proximal to the outlet OUT, the oil height drops near the input of the same tank, with the result that the third portion of the first conveyor belt N1 is closer to or even outside the free surface OL cooking oil.

The terms "height", "level" and "free surface" represent a distance from the PV floor, therefore they are equivalent and often interchangeable terms.

At least for a portion of the path between the input and outlet of the tank, the S.

According to the example of FIG. 1, these immersion means S are made by means of a conveyor belt, arranged to simultaneously perform two functions:

keep the product more submerged than its intrinsic buoyancy capacity, advance the product towards the exit.

The effect of being able to adjust the oil level, or the position of the immersion means with respect to the OL oil level or the inclination of the tank, allows to manage the interaction between the product and the immersion means, obtaining a predetermined level of unevenness of the product surface.

The belt is shaped in such a way as to gently invite the product to enter and exit the cooking path.

The belt therefore has an open V conformation with an input portion SIN and an output portion SOUT.

When the product has finished cooking it is extracted by means of a conveyor belt. This can coincide with the first conveyor belt, which therefore can cross the tank from input to outlet.

In this case, the first conveyor belt comprises a fourth portion arranged at a third level L3 lower than the second level L2, to distance itself from the immersion means S, allowing the product to expand during cooking.

According to another variant of the invention, the third conveyor belt is arranged with respect to the second conveyor belt so as to press the product during cooking.

Preferably, the position of the third conveyor belt is adjustable so as to allow both a free expansion of the product and a limited expansion of the product during its cooking.

Near the exit, the first or third belt must reach a fourth level L4 higher than the OL oil level.

The fourth height can be higher, lower or coincident with the first height L1 and essentially depends on the conformation of the mechanized production line.

With reference to FIG. 1, the extraction of the product is carried out with a third conveyor belt N3 independent of the first conveyor belt N1.

The third conveyor belt N3 runs for the entire tank. The possibility of using a conveyor belt independent of the first N1 allows the use of fixed porters FC, essentially fixed blades emerging from the surface of the third conveyor belt N3 and arranged transversally to the movement of the conveyor belt. The porters allow to grab the product and transfer it to the fourth level L4 with a significant slope, which allows optimal dripping of the oil from the same product.

The presence of the porters on the first conveyor belt could be an obstacle to the laying of the products on the same belt, having to synchronize the positioning of the products to be cooked between two consecutive porters. Nevertheless, such an implementation is also conceivable.

As can be seen in FIG. 1, it is preferred that the third conveyor belt is arranged for the entire length of the tank, even overlapping below the first conveyor belt.

In other words, it is desired that there are no parts of the tank in which there is no conveyor belt that carries residues and sediments to the exit.

Advantageously, the first and third conveyor belts run counter-current, therefore the porters of the third conveyor belt N3 also function as scrapers towards the first conveyor belt. Obviously, in this case the first conveyor belt is devoid of porters.

This means that a separator can be arranged at the outlet of the fryer which allows the cooked product to be collected and directed towards further stages of processing and to collect and separate residues of dough or seasoning that may spill into the tank and fall to the bottom of the same.

All these details combine perfectly with what is described later about the FF

Therefore, according to the configuration of FIG. 1, not only the product is ideally cooked, but also the contextual cleaning of the frying tank is obtained.

The present invention allows the still raw product to be conveyed on the conveyor belt N1 and the fryer performs cooking autonomously, conveying the product along the cooking tank to the output OUT.

From FIG. 1 it can be appreciated that the third portion of the first conveyor belt N1 is approximately parallel to the immersion means S. Furthermore, the third conveyor belt N3 runs backwards such that to overlap with the third portion of the first conveyor belt N1, thus it is parallel with the first conveyor belt and tangent by means of the relative porters.

Figure 2:
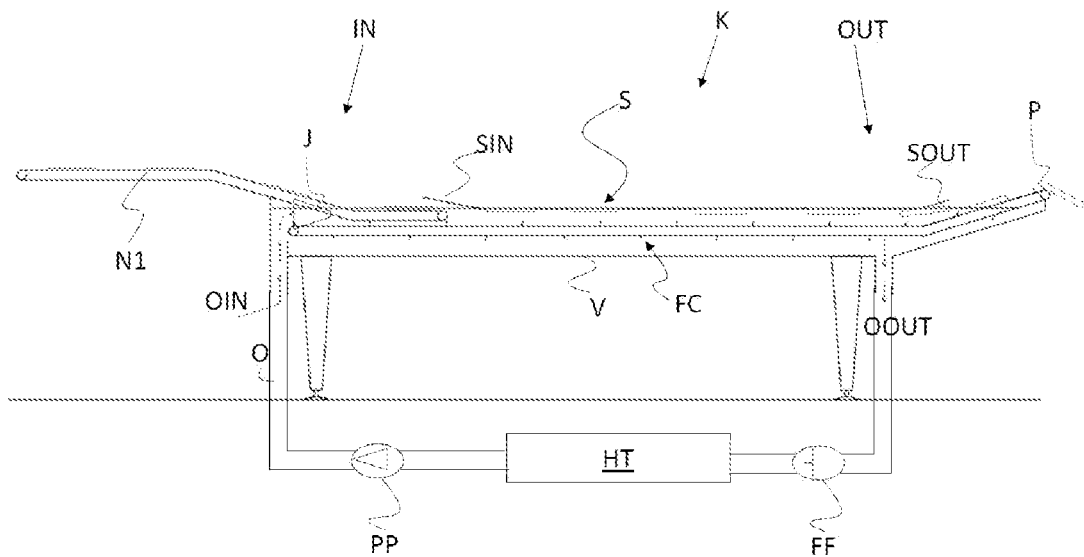
FIG. 2 shows a second preferred variant of the invention.

In FIG. 2, the immersion means S are made by means of a fixed flat sheet of stainless steel folded so as to form an invitation at the input and preferably also an outlet as described above. In this case, it is possible to control the progress of the product by extending the porters of the third conveyor belt N3, without overlapping portion between first and third conveyor belt, or by means of nozzles J that push oil in the direction of advancement of the product.

Figure 3:
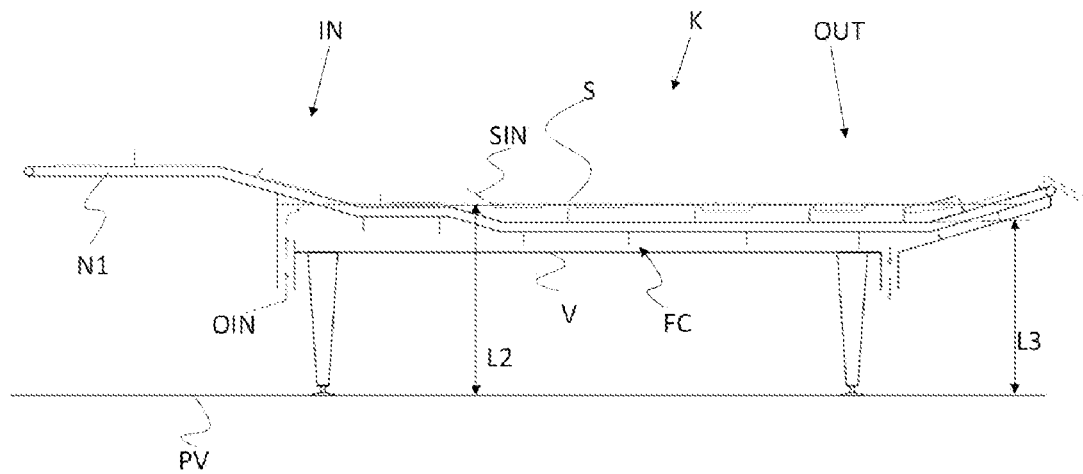
FIG. 3 shows a third preferred variant of the invention.

In FIG. 3. the first conveyor belt N1 includes a fifth portion approximately parallel with the oil surface O arranged at a third level L3 lower than the second level L2 and interconnected with the third portion by means of a fourth interconnection portion.

The oil can be heated either by means of a heater placed inside the tank or outside the tank with a circuit that allows the oil to circulate.

Regardless of the product pushing system, along the cooking path, it is preferred that the oil is pumped into the tank at a point proximal to the input IN and extracted from the tank at a point proximal to the outlet OUT. other words, the circulation of the oil and the motion of the product are preferably in agreement.

This allows to obtain the effects:

the oil is hotter when the product enters the tank with a first cooking phase that lasts a few seconds, from 1 to 4, impurities and/or cooking residues are pushed together with the product towards the outlet.

Therefore, the pushing means comprise cooking oil ejection means J arranged so as to advance the product along the path. These consist of nozzles J affixed to the tank at the input and oriented towards the outlet.

In particular, if the tank has a rectangular and elongated shape between the input and the outlet, the nozzles are preferably arranged along the short side of the input and at least in a portion of the long sides adjacent to the short side of the inlet to push forward the product till the output.

It must be taken into account that preferably the first conveyor belt is made by means of a steel mesh or composite material suitable for the purposes and therefore the oil jets made by the nozzles cross the first belt, helping not only the product to detach from the belt but to navigate towards the exit.

The nozzles are arranged approximately at the level of the free oil surface or a few millimeters below the free surface to maximize thrust.

Preferably, the heating of the oil external to the tank is carded out by means of an oil circulation system external to the tank comprising an HT heater, an oil withdrawal duct OOUT connected to the tank approximately at the outlet, an oil input duct ON connected to the tank at the input and an oil circulation pump PP.

The circulation system further includes an filter FF for cleaning the oil recirculated by the oil circulation system. Preferably, the filter is of the cyclonic type.

When the conveyor belt placed at the exit of the tank is equipped with porters, these, as described above, can more easily collect and separate the impurities from the product while keeping the tank clean.

It is clear that there must be coordination between the first conveyor belt and the pushing means.

The frequency of entry of the product into the tank must coincide with the output frequency in order not to accumulate product in the tank or, on the contrary, to prevent it from working at full capacity.

Nevertheless, the rotation speed of the second conveyor belt can be lower than the speed of the first conveyor belt. Evidently, fewer product units per unit length of the same first conveyor belt are arranged on the first conveyor belt.

This gives the advantage of being able to move the product more quickly, obtaining an easy detachment of the same when the product goes through the second portion, downhill, and the third portion of the first conveyor belt.

In other words, the first conveyor belt "throws" the product into the tank, to give it an initial push towards the OUT exit.

This also allows for a natural advancement of the product for a portion of the journey between the input and exit of the tank.

It should be further clear that the product tends to expand during cooking. This implies that there must be sufficient space between the immersion means and the bottom of the tank V or between the immersion means and the third conveyor belt N3 to allow the product to expand.

A preferred variant of the present invention advantageously allows to carry out a first cooking phase in which the product, supported by the first conveyor belt N1, cooks at the bottom and expands. Subsequently, the remaining dough is cooked, with possible filling.

Total cooking can last from 1 to 4 minutes depending on the size of the product.

Figure 4:
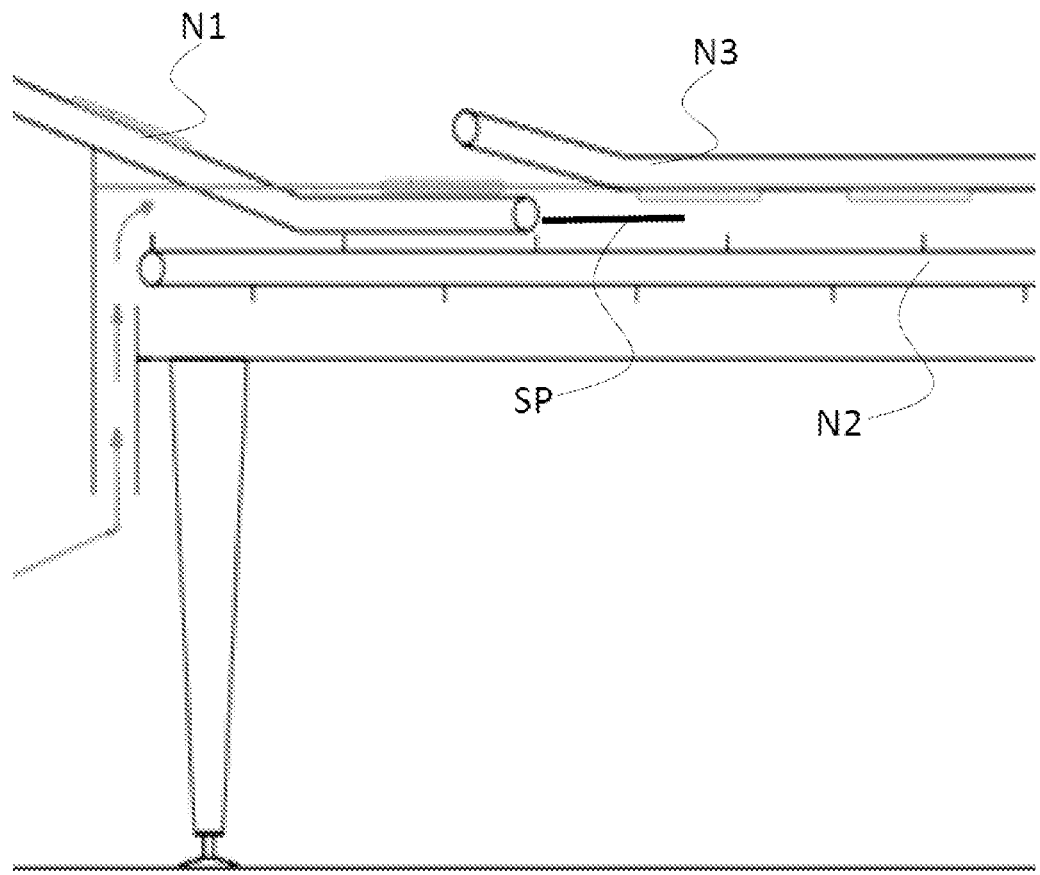
FIG. 4 shows a construction variant applicable to the variants of FIGS. 1 and 2.

FIG. 4 shows a flat element SP which acts as a support in continuity with the first conveyor belt N1 to ensure that the product begins to float autonomously even in cases of incomplete leavening of the product.

When there is a third conveyor belt, independent from the first, to extract the cooked product from the tank, it may happen that the third belt is several centimeters below or further along the path with respect to the first conveyor belt. If the product has not reached the correct leavening, the formation of alveoli during cooking is slowed down and therefore the product could fall to the bottom of the bowl deforming irreparably.

For this reason the present invention aims to foresee just one single conveyor belt that introduces and extract the product from the tank having a V shape, or two conveyor belts at least contiguously arranged or even overlapped.

A support SP can be arranged 1 to 4 cm below level L2 and approximately parallel with the oil surface. It consists of a sheet contiguously arranged with the end of the first conveyor belt to facilitate the forward advancement of the product. It can be envisaged that the support SIP is slightly inclined forward towards the outlet OUT from the tank.

Thanks to the support SP it is possible to keep the internal portion of the first conveyor belt short enough and to obviate the problem that is encountered in case of imperfect leavening of the product.

The shaping, spreading and filling of the product, as well as its packaging, can be carried out by means of systems and devices known per se and arranged downstream of the fryer.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

What is claimed is:

1. A fryer for frying pizza, comprising:
   a frying tank configured to be filled with cooking oil;
   a first conveyor belt configured to introduce a product into the frying tank, wherein the first conveyor belt comprises a horizontal section for horizontally loading the product into the frying tank:
   a second conveyor belt configured to maintain the product immersed in the cooking oil;
   a third conveyor belt located across the entire frying tank and below the first conveyor belt;
   an inclined support sheet located at an end of the horizontal section of the first conveyor belt; and
   a nozzle in the frying tank configured to move the product along with the cooking oil in the frying tank.

2. The fryer according to claim 1, wherein
   the nozzle ejects the cooking oil to advance the product in the frying tank.

3. The fryer according to claim 2, wherein the nozzle is fixed to the frying tank.

4. The fryer according to claim 1, further comprising an oil circulation system external to the frying tank, and the oil circulation system comprises:

a heater, an oil sampling duct connected to the frying tank approximately at the outlet, an input duct connected to the frying tank at the input, and an oil circulation pump.

5. The fryer according to claim 4, wherein the oil circulation system further comprises a filter for cleaning oil recirculated by the oil circulation system, and the filter is arranged upstream of the oil circulation pump according to an oil circulation.

6. The fryer according to claim 1, wherein the first conveyor belt comprises a first portion, a second portion and the horizontal section;

the first portion is external to the frying tank and arranged at a first height with respect to a floor, wherein the first height is higher than a height of the cooking oil with respect to the floor;

the horizontal section is arranged inside the frying tank to be in operating conditions at a second height lower than the height of the cooking oil, and the horizontal section is parallel with a surface of the cooking oil; and the second portion is arranged to interconnect the first portion with the horizontal section.

7. A fryer for frying pizza, comprising:

a frying tank configured to be filled with cooking oil; and a conveyor belt configured to introduce a product into the frying tank;

wherein the conveyor belt comprises a first portion, a second portion, a third portion, a fourth portion, and a fifth portion;

the first portion is external to the frying tank and arranged at a first height with respect to a floor, wherein the first height is higher than a height of the cooking oil with respect to the floor;

the third portion is arranged inside the frying tank to be in operating conditions at a second height lower than the height of the cooking oil, and the third portion is parallel with a surface of the cooking oil;

the second portion is arranged to interconnect the first portion with the third portion;

the fifth portion is approximately parallel with the surface of the cooking oil arranged at a third height lower than the second height, and the fifth portion is interconnected with the third portion by the fourth portion.

8. The fryer according to claim 7, wherein the conveyor belt further comprises an outlet portion for extracting a cooked product from the frying tank and bring the cooked product to a fourth height higher than a height of the cooking oil.

9. The fryer according to claim 1, wherein the third conveyor belt comprises an outlet portion and a portion inside the frying tank;

the outlet portion is configured to extract a cooked product from the frying tank and bring the cooked product to a height higher than a height of the cooking oil;

the portion inside the frying tank is horizontally across the frying tank.

10. The fryer according to claim 9, wherein the third conveyor belt comprises porters arranged at least to hook the cooked product to the outlet of the frying tank and bring the cooked product to the height to obtain a dripping of the cooked product.

11. The fryer according to claim 10, wherein the first conveyor belt and the third conveyor belt are mutually positioned by the porters acting as scrapers towards the first conveyor belt.

12. The fryer according to claim 1, wherein the third conveyor belt further comprises spaced-apart porters.

13. The fryer according to claim 1, wherein the frying tank further comprises multiple adjustable support feet.

14. The fryer according to claim 1, wherein the first conveyor belt has an advancement speed higher than a speed of the second conveyor belt.

* * * * *